United States Patent [19]

Serizawa et al.

[11] Patent Number: 4,794,816
[45] Date of Patent: Jan. 3, 1989

[54] DUAL-TYPE DAMPER DEVICE

[75] Inventors: Minoru Serizawa, Komaki; Yutaka Tazuke, Kasugai, both of Japan

[73] Assignees: Tokai Rubber Industries, Ltd.; Toyota Jidosha Kabushiki Kaisha, both of Aichi, Japan

[21] Appl. No.: 917,543

[22] Filed: Oct. 10, 1986

[30] Foreign Application Priority Data

Oct. 15, 1985 [JP] Japan .............................. 60-157477[U]
Dec. 25, 1985 [JP] Japan .............................. 60-200984[U]

[51] Int. Cl.⁴ .................................................. F16F 15/10
[52] U.S. Cl. ......................................... 74/574; 474/166
[58] Field of Search .......................... 74/574, 572, 604; 188/379, 378; 474/166; 464/89, 93, 87, 83, 180

[56] References Cited

U.S. PATENT DOCUMENTS

| | | | |
|---|---|---|---|
| 1,928,119 | 9/1933 | Vargha | 74/604 |
| 1,962,746 | 6/1934 | Lee | 74/574 |
| 2,484,241 | 11/1947 | Mulheim . | |
| 2,594,555 | 4/1952 | Hardy | 74/574 |
| 2,636,399 | 4/1953 | O'Connor | 74/574 |
| 2,723,573 | 11/1955 | Dillman | 74/574 |
| 2,834,225 | 5/1958 | Carter et al. | 74/574 |
| 2,861,472 | 11/1958 | Hansz | 74/574 |
| 2,949,021 | 8/1960 | Charlesworth | 464/180 X |
| 3,126,760 | 3/1964 | Peirce | 74/574 |
| 3,670,593 | 6/1972 | Troyer | 74/574 |
| 4,254,847 | 3/1981 | Kamman et al. | 74/574 |
| 4,378,865 | 4/1983 | Mclean | 74/574 X |
| 4,710,152 | 12/1987 | Ichikawa et al. | 474/166 |

FOREIGN PATENT DOCUMENTS

| | | | |
|---|---|---|---|
| 0135646 | 4/1985 | European Pat. Off. . | |
| 2053326 | 5/1972 | Fed. Rep. of Germany | 464/89 |
| 3608402 | 9/1986 | Fed. Rep. of Germany . | |
| 55-135838 | 3/1979 | Japan . | |
| 56-115050 | 9/1981 | Japan . | |
| 58-70554 | 5/1983 | Japan . | |
| 58-77946 | 5/1983 | Japan | 74/574 |
| 61-211552 | 9/1986 | Japan | 74/574 |
| 2146408 | 4/1985 | United Kingdom | 74/574 |

Primary Examiner—Gary L. Smith
Assistant Examiner—Rodney M. Lindsey
Attorney, Agent, or Firm—Parkhurst, Oliff & Berridge

[57] ABSTRACT

A dual-type damper for damping vibration of a rotation axle, having a damper pulley including a boss portion joined to the rotation axle, a cylindrical portion located radially outwardly of the boss portion, and a connection portion connecting the boss and cylindrical portions; a first damper mass disposed radially outwardly of the cylindrical portion, concentrically with the same; a first resililent member interposed between the cylindrical portion and the first damper mass; and a metallic annular member press-fitted onto an inside surface of the cylindrical portion. A second damper mass having a cylindrical shape is disposed between the connection portion and the annular member, in an inner space of the cylindrical portion, concentrically with the cylindrical portion; is (f) a second resilient member disposed between the annular member and one axial end of the second damper mass, so as to secure the second damper mass to the annular member. A dual-type damper of another embodiment has a damper pulley including a cylindrical portion; a first damper mass; a first resilient member; a second damper mass having a cylindrical shape and disposed in an inner space of the cylindrical portion; a second resilient member supporting the second damper mass at one axial end of the same; and a third resilient member mounted on an outside surface of the second damper mass, or on an inside surface of the cylindrical portion.

7 Claims, 4 Drawing Sheets

DUAL-TYPE DAMPER DEVICE

BACKGROUND OF THE INVENTION

1. Field of the Art

The present invention relates generally to a dual-type damper device, and more particularly to such a damper device for absorbing vibration of, for example, a rotation axle of an internal combustion engine, so as to reduce vibration and noise caused by the vibration of the rotation axle or the engine.

2. Related Art Statement

Generally, a rotation axle of an internal combustion engine, such as a crankshaft, is subjected to a variable torque, while being rotated, and the rotation axle or the engine produces very complex vibration and/or noise. The rotation axle may be broken due to the complex vibration.

In the above-indicated background of the art, a method has been employed of attaching a flywheel to a rotation axle of an engine of an automotive vehicle, in order to level the variable torque exerted to the rotation axle. Further, the Japanese Utility Model Applications laid open under Publication Nos. 55-135838 and 56-115050 disclose a so-called dynamic damper device, a torsional damper device which incorporates a secondary vibration system. The torsional damper device has a generally cylindrical shape and is joined to a rotation axle (primary vibration system) of an engine. The secondary vibration system is adapted to resonate with the rotation axle, so as to absorb or restrain vibration and/or noise caused by the vibration of the rotation axle.

There is known an example of such a torsional damper device which comprises a damper pulley including a boss portion joined to a rotation axle, such as a crankshaft, a damper-mass member disposed radially outwardly of the damper pulley such that the damper-mass member and the damper pulley are concentric with each other, and a buffer member in the form of a cylindrical resilient member interposed between the damper pulley and the damper-mass member. The resilient member is made of a rubber material or the like. The torsional damper device is designed to reduce vibration and/or noise produced by the engine, by means of narrowing resonance amplitude of the torsional vibration of the rotation axle (crankshaft).

However, vibration produced by the rotation axle is a complex vibration including two main components, torsional vibration and bending vibration (vibration in directions perpendicular to an axis of the rotation axle), and takes a variety of vibration modes depending upon how the rotation axle or the engine is supported by other members. Conventional dynamic damping devices, such as the torsional damper device as indicated above, have been unsatisfactory to damp such complex vibration.

This is because the torsional damper device is capable of damping the torsional vibration of the rotation axle, but incapable of damping the bending vibration of the same. The torsional damper device effectively restrains the torsional vibration through relative displacement between the damper pulley and the damper-mass member (secondary vibration system) due to shear deformation of the cylindrical resilient member therebetween. In order to obtain the desired damping effect on the torsional vibration of the rotation axle, the cylindrical resilient member of the torsional damper device has a comparatively low spring constant in the directions perpendicular to the axis of the rotation axle. And, the thickness of the resilient member is limited to a small value. The cylindrical resilient member having a low spring constant cannot effectively damp the bending vibration. This is because the resilient member having a low spring constant cannot produce a large tensile or compression deformation to damp the bending vibration. In short, the conventional torsional damper device is effective against the torsional vibration of the rotation axle but ineffective against the bending vibration.

In recent years there has been also proposed a dual-type damper device which incorporates a pair of damper-mass members. The dual-type damper device is joined to a crankshaft of an internal combustion engine, for the purpose of dealing with complicated vibration associated with increased operating performance of the engine.

This dual-type damper device has a construction in that a conventional torsional damper device which has a first damper-mass member for damping the torsional vibration further incorporates a second damper-mass member of cylindrical shape, in an inner space of a cylindrical portion of a damper pulley, concentrically with the cylindrical portion, and in between an inside surface of the damper pulley and an outside surface of the second damper-mass member is interposed a cylindrical resilient member with a thin wall. In other words, in comparison with the conventional torsional damper device, the proposed dual-type damper device has newly employed a member serving as another first damper-mass member for damping the torsional vibration. This dual-type damper device is unsatisfactory to damp the vibration of the rotation axle which includes the bending vibration.

Any one of the above-identified conventional damper devices which are used for absorbing or restraining vibration caused by the rotation axle, are effective against only the torsional vibration and not effective against the bending vibration. That is, the conventional damper devices are not effective against the vibration including both the tosional and bending vibrations. Therefore, those devices do not reduce vibration and/or noise caused by a crankshaft of an internal combustion engine. A noise around 350 Hz caused by the bending vibration of the crankshaft makes an uncomfortable knocking noise. The conventional damper devices are incapable of damping the noise around 350 Hz caused by the crankshaft of the internal combustion engine.

SUMMARY OF THE INVENTION

It is therefore an object of the present invention to provide for a dual-type damper which is joined to a rotation axle such as a crankshaft of an internal combustion engine and which is capable of damping both torsional vibration and bending vibration (vibration in directions perpendicular to an axis of the rotation axle) of the rotation axle, so as to effectively reduce vibration and/or noise caused by the vibration of the rotation axle or by operation of the engine.

According to a first aspect of the present invention, there is provided a dual-type damper device for damping vibration of a rotation axle, having (a) a damper pulley including a boss portion joined to the rotation axle, a cylindrical portion located radially outwardly of the boss portion, and a connection portion connecting the boss portion and the cylindrical portion; (b) a first damper-mass member disposed radially outwardly of the cylindrical portion of the damper pulley, such that the first damper-mass member is spaced apart from, and concentric with, the cylindrical portion; (c) a first resilient member interposed between the cylindrical portion of the damper pulley and the first damper-mass member; (d) an annular member made of a metallic material and press-fitted onto an inside surface of the cylindrical portion of the damper pulley; (e) a second damper-mass member having a cylindrical shape and disposed between the connection portion of the damper pulley and the annular member, in an inner space of the cylindrical portion of the damper pulley, such that the second damper-mass member and the cylindrical portion are concentric with each other; and (f) a second resilient member disposed between the annular member and one of axial ends of the second damper-mass member which is opposed to the annular member, so as to secure the second damper-mass member to the annular member, the second resilient member being subjected to shear deformation thereof due to relative radial displacement between the annular member and the second damper-mass member.

In the dual-type damper device constructed as described above, the first damper-mass member serves as a first secondary vibration system for damping torsional vibration of the rotation axle (primary vibration system), as in the conventional torsional damper divice. That is, the first damper-mass member serves as an effective dynamic damping member for damping the torsional vibration. On the other hand, the second damper-mass member serves as a second secondary vibration system for damping bending vibration of the rotation axle. The second resilient member through which the second damper-mass member is secured to the annular member has a comparatively high spring constant in the directions perpendicular to the axis of the rotation axle. The second resilient member being comparatively soft easily yields to shear deformation thereof, permitting the second damper-mass member to be easily displaced in the directions perpendicular to the axis of the rotation axle. Thus, the second damper-mass member serves as an effective dynamic damping member for damping the bending vibration of the rotation axle.

Joined to a rotation axle such as a crankshaft of an internal combustion engine, the dual-type damper device of the present invention effectively restrains vibration caused by the rotation axle, so that vibration and/or noise produced by the rotation axle or the engine are remarkably reduced. A damper device capable of damping both torsional and bending vibrations of a rotation axle is now available for the first time.

The second secondary vibration system for damping the bending vibration has a simple construction in which the second damper-mass member is secured to the annular member through the second resilient member vulcanized therebetween, and is easily fixed to the damper pulley by means of press-fitting the annular member onto the inside surface of the cylindrical portion of the damper pulley. Therefore, the second secondary vibration system, and also the damper device itself, are easily assembled.

It is to be appreciated that the second damper-mass member of the second secondary vibration system is disposed within the inner space of the cylindrical portion of the damper pulley such that the second mass is positioned between the connection portion of the pulley and the annular member press-fitted onto the inside surface of the cylindrical portion, while secured to the annular member through the second resilient member. If by any chance for second resilient member is broken or fractured due to, for example, deterioration thereof, the annular member serves for stopping the second damper-mass member from falling off the damper device. The dual-type damper device is constructed safe in the above point of view.

As previously described, the second secondary vibration system of the instant damper device has a simple construction consisting of the second damper-mass member and second resilient member for securing the second damper-mass member to the annular member. A natural frequency of the second secondary vibration system depends upon a mass of the second damper-mass member and upon a spring constant of the second resilient member. Therefore, the natural frequency of the second secondary vibration system is easily tuned to a resonant frequency of the vibration of the rotation axle that is to be damped. The dual-type damper device having the well-tuned second secondary vibration system exhibits a good damping effect against the vibration of the rotation axle including the bending vibration.

In a preferred embodiment of the first aspect of the invention, the second damper-mass member is secured to the annular member, in a process of vulcanization of the second resilient member between the one axial end of the second damper-mass member and the annular member.

In another embodiment of the first aspect, the first damper-mass member is in the form of a V-ribbed cylindrical body which has in an outside surface thereof a plurality of V-grooves around which at least one V-belt is wound.

In still another embodiment, the annular member also serves as stopper means for preventing the second damper-mass member from falling off the dual-type damper device.

In a further embodiment of the first aspect, the annular member has at least one through-hole for supporting the second resilient member.

In a still further embodiment of the first aspect of the invention, the dual-type damper device further comprises a third resilient member which is mounted on an outside surface of the second damper-mass member, or on the inner surface of the cylindrical portion of the damper pulley which is opposed to the outside surface, and which is brought into butting contact with the inner surface of the cylindrical portion, or with the outside surface of the second damper-mass member, when the second damper-mass member is largely displaced relative to the cylindrical portion.

In a preferred form of the above embodiment, the third resilient member extends to a predetermined height from the outside surface of the second damper-mass member toward the inside surface of the cylindrical portion of the damper pulley, or from the inside surface toward the outside surface. In this case, the second damper-mass member has in the outside surface thereof an annular groove in which the third resilient member is partially fitted.

According to a second aspect of the present invention, there is provided a dual-type damper device for damping vibration of a rotation axle, having (a) a damper pulley including a boss portion joined to the rotation axle, a cylindrical portion located radially outwardly of the boss portion, and a connection portion connecting the boss portion and the cylindrical portion;

(b) a first damper-mass member disposed radially outwardly of the cylindrical portion of the damper pulley, such that the first damper-mass member is spaced apart from, and concentric with, the cylindrical portion; (c) a first resilient member interposed between the cylindrical portion of the damper pulley and the first damper-mass member; (d) a second damper-mass member having a cylindrical shape and disposed in an inner space of the cylindrical portion of the damper pulley; (e) a second resilient member supporting the second damper-mass member at one of axial ends of the second damper-mass member, and subjected to shear deformation thereof due to radial displacement of the second damper-mass member; and (f) a third resilient member mounted on an outside surface of the second damper-mass member, or on an inside surface of the cylindrical portion of the damper pulley which is opposed to the outside surface of the second damper-mass member, the third resilient member being brought into butting contact with the inside surface of the cylindrical portion, or the outside surface of the second damper-mass member, when the second damper-mass member is largely displaced relative to the cylindrical portion of the damper pulley.

In the dual-type damper device constructed as indicated above, the first damper-mass member serves as a first secondary vibration system for damping torsional vibration caused by the rotation axle, while the second damper-mass member serves as a second secondary vibration system for damping bending vibration caused by the rotation axle. Consequently, the vibration caused by the rotation axle including the torsional and bending vibrations is effectively damped by the instant dual-type damper device, and vibration and/or noise produced by an engine having the rotation axle are remarkably restrained. Furthermore, if the second damper-mass member is largely displaced relative to the damper pulley, due to a large vibration exerted to the damper device in the radial direction thereof, the third resilient member disposed on the outside surface of the second damper mass member or on the inside surface of the cylindrical portion of the damper pulley is brought into butting contact with the outside surface or the inside surface, alleviating an impact of the second damper-mass member against the inside surface of the cylindrical portion. Therefore, the third resilient member contributes to increasing operating performance and durability of the dual-type damper device.

In a preferred embodiment of the dual-type damper device according to the second aspect of the invention, the third resilient member extends to a predetermined height from the outside surface of the second damper mass toward the inside surface of the cylindrical portion, or from the inside surface toward the outside surface.

In a further preferred embodiment of the second aspect of the invention, the second damper-mass member has in the outside surface thereof an annular groove in which the third resilient member is partially fitted.

In another embodiment of the second aspect, the second resilient member is fixed to the connection portion of the damper pulley.

In still another embodiment of the second aspect, the dual-type damper device further comprises an annular support member fixed to the connection portion of the damper pulley, and the second resilient member is fixed to the annular support member.

In a further embodiment of the second aspect of the invention, the dual-type damper device further comprises stopper means for preventing the second damper-mass member from falling off the dual-type damper device.

In a preferred form of the above embodiment, the second resilient member is fixed to the stopper means. In this case, the dual-type damper device may further comprises a set bolt for joining the boss portion of the damper pulley to the rotation axle. The set bolt is located inside the second damper-mass member and fixed to the rotation axle, and the stopper means comprises a circular member which is fixed at a central portion thereof to the set bolt and which supports at an outer annular portion thereof the second resilient member.

In a still further embodiment of the second aspect, the second resilient member is formed through vulcanization.

In a yet further embodiment of the second aspect of the invention, the first damper-mass member is in the form of a V-ribbed cylindrical body which has in an outside surface thereof a plurality of V-grooves around which at least one V-belt is wounded.

BRIEF DESCRIPTION OF THE DRAWINGS

The foregoing and other objects, features and advantages of the present invention will be better understood by reading the following description of examples of the invention, when considered in connection with the accompanying drawings, in which.

THE PREFERRED EMBODIMENT OF THE INVENTION

There will be described in detail a preferred embodiment of the present invention, with reference to the accompanying drawings.

Figure 1:
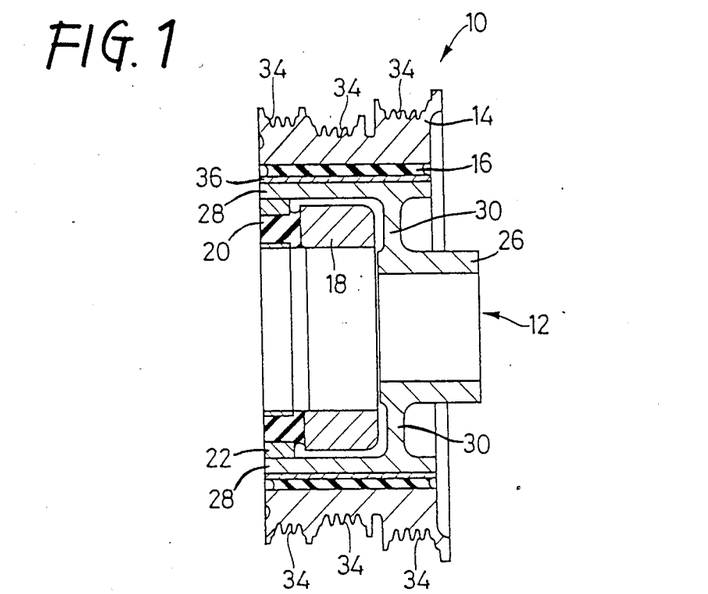
FIG. 1 is a longitudinal cross sectional view of a first embodiment of a dual-type damper according to the present invention.

Referring first to FIG. 1, there is illustrated a dual-type damper 10 constructed according to the present invention. The dual-type damper 10 serves as not only a vibration damper but also a V-grooved pulley.

Reference numeral 12 designates a damper pulley which is located at a central portion of the dual-type damper 10 and which has a generally cylindrical shape. A first damper mass 14 having a cylindrical shape is disposed radially outwardly of the damper pulley 12 such that the first damper mass 14 and the damper pulley 12 are spaced apart from each other by a predetermined distance and concentric with each other. The first damper mass 14 is made of steel. A first resilient member 16 is interposed between the damper pulley 12 and the first damper mass 14. The first resilient member 16 is made of rubber. An annular member 22 is fitted onto an inside surface of a cylindrical portion 28 of the damper pulley 12 at one of the axial ends of the cylindrical portion 28, so as to be fixed thereto. The damper pulley 12 is made of steel. A second damper mass 18 is secured at one of the axial ends thereof to one of the opposite surfaces of the annular member 22 by means of a second resilient member 20. The second damper mass 18 has a cylindrical shape and is made of steel. The second resilient member 20 is made of rubber. Thus, the second damper mass 18 is disposed in an inner space of the cylindrical portion 28 of the damper pulley 12 such that the second damper mass 18 and the damper pulley 12 are spaced apart from each other by a predetermined distance and concentric with each other.

Figure 2:
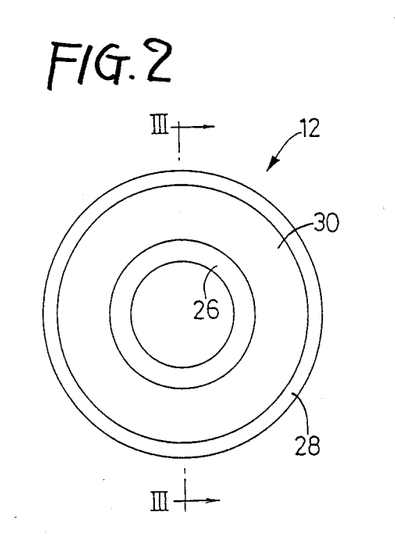
FIG. 2 is a front view of a damper pulley used in the dual-type damper of FIG. 1.
Figure 3:
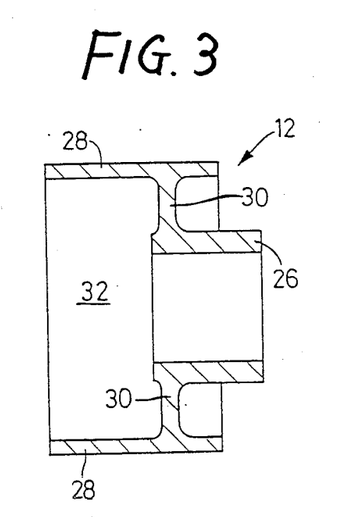
FIG. 3 is a cross sectional view taken along line III—III of FIG. 2.

The damper pulley 12 will be illustrated in greater detail hereafter. The damper pulley 12 is joined to a rotation axle, such as a crankshaft 8 of an internal combustion engine (FIG. 11), such that the damper pulley 12 is rotatable together with the crankshaft 8. As shown in FIGS. 2 and 3, the damper pulley 12 includes a boss portion 26, the cylindrical portion 28, and a connection portion 30. The boss portion 26 has a cylindrical shape with a smaller diameter than a diameter of the cylindrical portion 28. The boss portion 26 of the damper pulley 12 is joined to the crankshaft 8. The cylindrical portion 28 is located radially outwardly of the boss portion 26 such that the cylindrical portion 28 and the boss portion 26 are spaced from each other by a predetermined distance and concentric with each other. The connection portion 30 connects an outer surface of the boss portion 26 and an inner surface of the cylindrical portion 28. The connection portion 30 transverses the inner space of the cylindrical portion 28 in a direction of a diameter of the dual-type damper 10 (hereinafter, referred to as "radial direction"), and divides the inner space into one space in which the boss portion 26 is located and the other space which is longer than the one space in a direction of an axis of the dual-type damper 10 (hereinafter, referred to as "axial direction"). The other space serves as a second-mass space 32 in which the second damper mass 18 is disposed.

The first damper mass 14 which is disposed radially outwardly of the damper pulley 12 extends as long as the cylindrical portion 28 of the pulley 12, as measured in the axial direction of the damper 10. The first mass 14 has in an outside surface thereof a multitude of V-shaped grooves 34. One or more V-belts (not shown) are wound around the V-shaped grooves 34. Thus, the damper pulley 12 serves as a V-belt driving pulley for tranferring rotating or driving power from the crankshaft 8 to other members.

Figure 4:
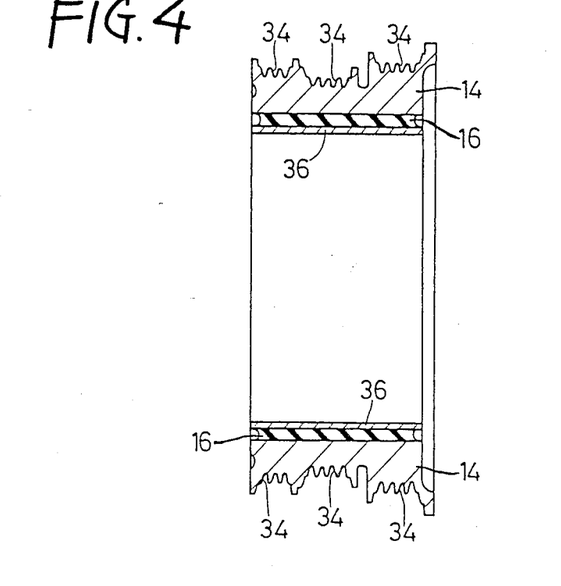
FIG. 4 is a longitudinal cross sectional view of a first assembly consisting of a first damper mass, a first resilient body, and a metallic sleeve, which is used in the dual-type damper device of FIG. 1.

Referring next to FIG. 4, there is illustrated the first resilient member 16 which is interposed between the damper pulley 12 and the first damper mass 14. Between the first resilient member 16 and the damper pulley 12 there is interposed a metallic sleeve 36 which has a cylindrical shape with a thin wall and which extends as long as the cylindrical portion 28 of the pulley 12. The metallic sleeve 36 is located radially inwardly of the first damper mass 14 such that the sleeve 36 and the first mass 14 are spaced apart from each other by a predetermined distance and concentric with each other. A first assembly consisting of the first damper mass 14, first resilient member 16 and metallic sleeve 36 is press-fitted onto an outside surface of the cylindrical portion 28 of the damper pulley 12, to provide the dual-type damper 10.

Figure 5:
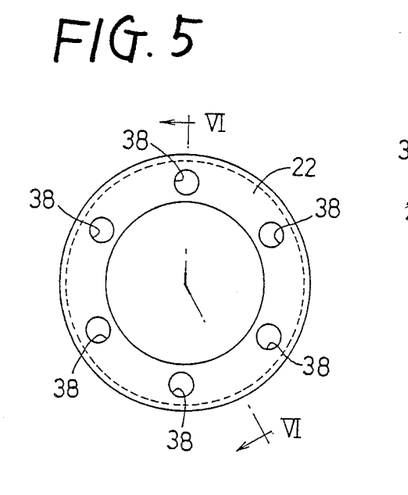
FIG. 5 is a front view of a second assembly consisting of a second damper mass, a second resilient member, and an annular member, which is used in the dual-type damper device of FIG. 1.
Figure 6:
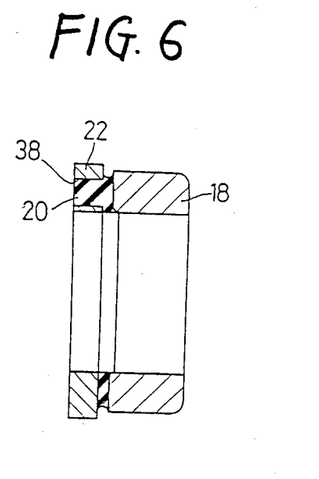
FIG. 6 is a cross sectional view taken along line VI—VI of FIG. 5.

As shown in FIGS. 5 and 6, the second damper mass 18 which is disposed within the second-mass space 32 of the damper pulley 12 and which has a cylindrical shape, is secured at one of axial ends thereof to one of opposite surfaces of the metallic annular member 22, by means of the annular, second resilient member 20 inserted therebetween. The second damper mass 18 and the annular member 22 has the same center line (axis) extending in the axial direction of the damper 10, after secured to each other. The annular member 22 has an outside diameter larger a predetermined value than that of the second damper mass 18. The second resilient member 20 has a predetermined thickness. The annular member 22 has half a dozen of through-holes 38 formed therethrough in the axial direction. The through-holes 38 are equiangularly spaced from each other, circumferentially of the annular member 22. The second resilient member 20 is brought in the through-holes 38 when vulcanized, which enhances the fixation between the second damper mass 18 and the annular member 22.

As shown in FIG. 1, the annular member 22 having the second damper mass 18 is fitted onto the inside surface of the cylindrical portion 28 of the damper pulley 12, at one of axial ends of the cylindrical portion 28, such that the second damper mass 18 is disposed in the second-mass space 32 of the cylindrical portion 28, concentrically with the cylindrical portion 28. Thus, the second damper mass 18 is supported by the damper pulley 12 through the second resilient member 20, concentrically with the damper pulley 12.

It is to be appreciated that the outside diameter of the second damper mass 18 is dimensioned smaller a predetermined value than an inside diameter of the cylindrical portion 28 of the damper pulley 12. This arrangement permits the second damper mass 18 to be displaced or moved relative to the annular member 22, by a predetermined distance in the radial direction, due to shear deformation of the second resilient member 20.

Next, a preferred process for manufacturing the dual-type damper 10 constructed as described hitherto will be illustrated below.

First, the first damper mass 14 and the metallic sleeve 36 are held in a concentric relationship with each other, and the first resilient member 16 is formed by vulcanizing a suitable rubber material between the two members 14 and 36. Consequently, the first mass 14 and the sleeve 36 are fixed to each other through the vulcanized first resilient member 16, and the first assembly of the three members 14, 16 and 36 is obtained.

On the other hand, the second damper mass 18 and the annular member 22 are held such that the two members 18 and 22 lie on the same axis, and that the two members 18 and 22 are spaced from each other by a predetermined distance. A suitable rubber material is injeteced through the through-holes 38 of the annular member 22 into a space between the second mass 18 and the annular member 22. The injected rubber material is vulcanized in that space so as to form the second resilient member.20. The second mass 18 is connected at one axial end thereof to one of opposite surfaces of the annular member 22 which is opposed to that one axial end of the second mass 18. Thus, the second assembly is obtained.

The second assembly is secured to the damper pulley 12 in the process of press-fitting the annular member 22 of the second assembly, onto the inside surface of the cylindrical portion 28 of the damper pulley 12.

Subsequently, the first assembly of the first damper mass 14, first resilient member 16 and metallic sleeve 36 is press-fitted onto the outside surface of the cylindrical portion 28 of the pulley 12. Thus, the dual-type damper device 10 is obtained.

In this connection, it is to be appreciated that the outside diameter of the annular member 22 is dimensioned larger a predetermined value than an inside diameter of the cylindrical portion 28 of the damper pulley 12. This arrangement provides a firm fixation between the annular member 22 and the damper pulley 12. It is also to be appreciated that an inside diameter of the metallic sleeve 36 is smaller a predetermined value than an outside diameter of the cylindrical portion 28 of the damper pulley 12. This arrangement permits the first resilient member 14 to be pre-compressed, and the first assembly to be firmly fixed to the damper pulley 12.

The dual-type damper 10 manufactured in the above-described process serves for the internal combustion engine, with an inside surface of the boss portion 26 of the pulley 12 joined to the crankshaft 8 of the engine.

In the dual-type damper 10 of the invention, torsional vibration (vibration in the circumferential direction of the damper 10) caused by rotatings of the crankshaft 8 to which the damper pulley 12 is joined, is effectively damped through vibration of the first damper mass 14 in the circumferential direction of the damper 10. The first resilient member 14 is deformed due to relative displacement between the pulley 12 and the first mass 14 in the circumferential direction. Thus, the first damper mass 14 serves as a first damping member (first secondary vibration system) for damping the torsional vibration. On the other hand, bending vibration (vibration in the radial direction of the damper 10) caused by rotatings of the crankshaft 8 is effectively damped through radial vibration of the second damper mass 18. The second resilient member 20 is deformed due to relative displacement between the pulley 12 and the second damper mass 18 in the radial direction of the damper 10. Thus, the second mass 18 serves as a second damping member (second secondary vibration system).

Complex vibration caused by the crankshaft 8 has two major components, the torsional vibration and the bending vibration. The instant dual-type damper 10 is capable of effectively absorbing both the torsional and bending vibrations. Consequently, vibration and/or noise produced by the internal combustion engine is remarkably reduced by the instant damper 10. In the case where the instant damper 10 is used with an engine of an automotive vehicle, the damper 10 remarkably restrains noise experienced in the passenger's room, particularly uncomfortable knocking noise caused by an around-350-Hz vibration which has not been restrained by conventional torsional dampers.

The second secondary vibration system of the damper 10 against the bending vibration is assembled of the second damper mass 18, annular member 22, and second resilient member vulcanized between the two members 18 and 22, and secured to the damper pulley 12 by press-fitting the annular member 22 onto the inside surface at the end of the cylindrical portion 28 of the damper pulley 12. Thus, the second secondary vibration system, and also the damper 10, are easily assembled. Further, the second damper mass 18 and the damper pulley 12 are accurately and easily positioned relative to each other on the same axis. This is because the second damper mass 18 is disposed in the second-mass space 32 by means of press-fitting the second assembly onto the inside surface of the cylindrical portion 28 of the pulley 12. Consequently, the number of inferior goods (damper devices) which have a second damper mass 18 at an inaccurate position is decreased.

The second damper mass 18 is disposed within the second-mass space 32 of the damper pulley 12, such that the second mass 18 is positioned between the connection portion 30 of the pulley 12 and the annular member 22 press-fitted onto the inside surface at the end of the cylindrical portion 28 of the pulley 12, and secured to the annular member 22 through the second resilient member 20. If by any chance the second resilient member 20 is broken, the annular member 22 will serve as a fail-safe mechanism for stopping the second mass 18 from falling off (springing out of) the second-mass space 32. The instant dual-type damper 10 is very safe in this point of view.

As previously described, the second secondary vibration system for damping the bending vibration has a simple construction. A natural frequency of the second secondary vibration system depends upon a mass of the second damper mass 18 and upon a spring constant of the second resilient member 20. The natural frequency of the second secondary vibration system can be easily tuned to a resonace frequency of the vibration of the crankshaft 8 that is to be damped.

Although the annular member 22 has the through-holes 38 for supporting the second resilient member 20, an annular member 22 without such through-holes may be usable in the instant dual-type damper 10.

Figure 7:
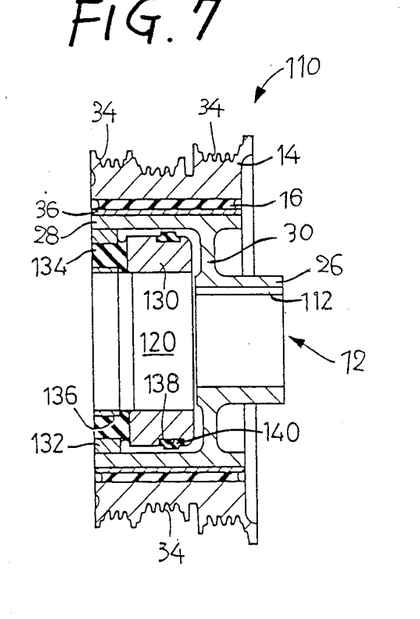
FIG. 7 is a longitudinal cross sectional view of a second embodiment of the dual-type damper of the present invention, corresponding to FIG. 1.
Figure 8:
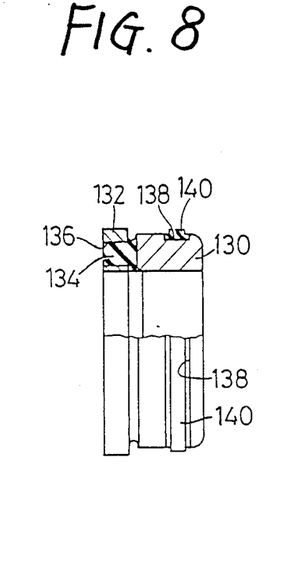
FIG. 8 is a partly cutaway, cross sectional view of an assembly of a second damper mass having a resilient stopper, a second resilient member, and an annular member, which is used in the dual-type damper device of FIG. 7.

Hereafter there will be another embodiment 110 of the present invention with reference to FIGS. 7 and 8. It is noted that a part or member having the same reference numeral through all the FIGS. 1–12 is provided with the same structure, and therefore re-description about such a part or member is omitted.

In FIG. 7, reference numeral 112 designates a key way (groove) formed in an inside surface of a boss portion 26 of a damper pulley 12. The key way 112 serves as a transmission means for transmitting driving power from a crankshaft 8 (FIG. 11) of an internal combustion engine to other following members.

Referring to FIG. 8, a second damper mass 130 which is disposed in a second-mass space 120 has in an outside surface thereof an annular groove 138 which runs circumferentially of the second mass 130. The annular groove 138 is positioned on the side of one of axial ends of the second mass 130 which is opposite to the other axial end of the same 130 at which the second damper mass 130 is secured secured to an annular member 132 through a second resilient member 134. In the annular groove 138 is partially fitted a third resilient member in the form of an annular resilient (rubber) stopper 140. The annular resilient stopper 140 includes a base portion which is partially fitted in the annular groove 138, and a boss portion protruding from the base portion to a predetermined height. The resilient stopper 140 has a substantially rectangular cross section. Thus, the resilient stopper 140 provides an annular resilient boss with a predetermined height, around the outside surface of the second damper mass 130.

If the second damper mass 130 is largely displaced relative to the damper pulley 12 due to a transitory large vibration produced by the engine, the annular rubber stopper 140 running circumferentially of the second mass 130 is brought into butting contact with an inside surface of a cylindrical portion 28 of the pulley 12, alleviating an impact of the second damper mass 130 against the pulley 12. As a result, uncomfortable noise caused by the impact between the second mass 130 and the damper pulley 12 are prevented. Plastic deformation and/or fracture of the cylindrical portion 28 and/or the second damper mass 130 are also prevented. Thus, the dual-type damper 110 exhibits increased operating performance and enjoys increased durability.

Figure 9:
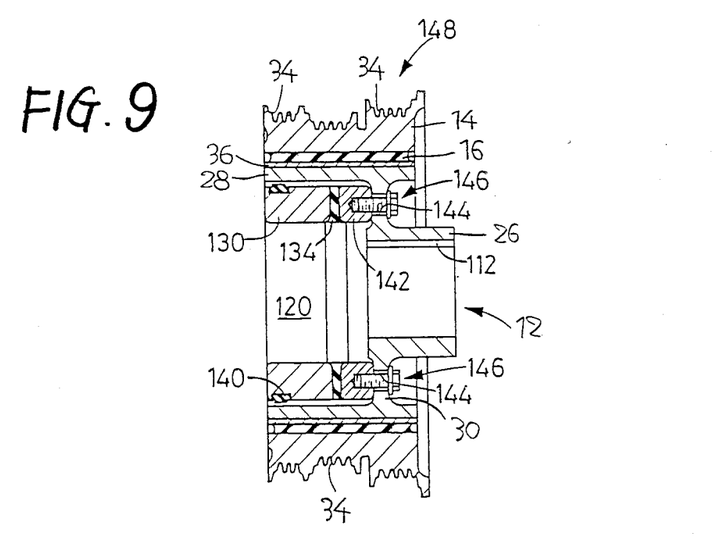
FIGS. 9–11 are a longitudinal cross sectional view of other embodiments of the dual-type damper device of the invention, respectively.

Referring next to FIG. 9, there is illustrated still another embodiment 148 of the dual-type damper according to the present invention.

The dual-type damper 148 is provided with a damper pulley 12 which has the same structure as that of the previously-described damper 10 or 110. In a second-mass space 120 of the damper pulley 12, there is disposed a second damper mass 130 which has a resilient stopper 140 in an outside surface thereof. The second damper mass 130 is secured to an annular member 142 through a second resilient member 134, while the annular member 142 is fixed to a connection portion 30 of the damper pulley 12, with the help of a plurality of attachment bolts 146. In this case, an assembly consisting of the second damper mass 130, second resilient member, and annular member 142 is fixed to the connection portion 30 of the damper pulley 12. The annular member has substantially the same cross sectional configuration as that of the second damper mass 130. The attachment bolts 146 are inserted in a plurality of through-holes 144 formed through the connection portion 30 of the damper pulley 12, for the fixation of the above-indicated assembly to the connection portion 30.

The dual-type damper 148 enjoys the same advantages as those of the previously-described damper 110. That is, the first and second damper masses 14 and 130 serve as the first and second secondary vibration systems for damping the torsional and bending vibrations of a rotation axle, respectively. The resilient stopper 140 mounted on the outside surface of the second damper mass 130 serves for absorbing the impact which is produced between the second damper mass 130 and the damper pulley 12 when a large vibration is exerted from the rotation axle to the damper 148. The dual-type damper 148 has another advantage in that the second secondary system (above-identified assembly including the second damper mass) is easily exchanged for another if by any chance the second secondary system is broken. Consequently, the durability of the dual-type damper 148 is increased.

Figure 10:
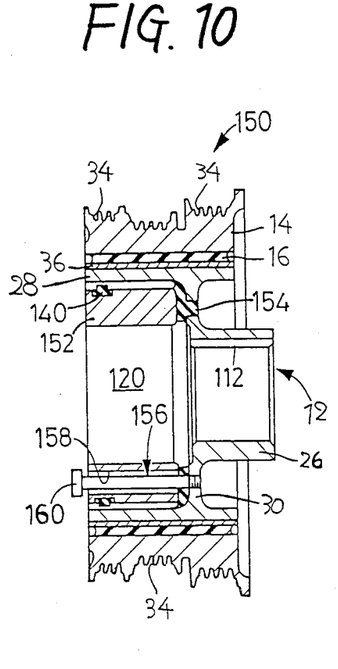

Referring to FIG. 10, there is a further embodiment 150 of the dual-type damper according to the present invention.

The dual-type damper 150 is provided with a damper pulley 12 which has the same structure as that of the previously-described damper 10, 110 or 148. In a second-mass space 120 of the damper pulley 12, there is disposed a second damper mass 152 which has in an outside surface thereof a resilient stopper 140. The second damper mass 152 is secured to a connection portion 30 of the damper pulley 12 through a second resilient member 154. In the figure, reference numeral 156 designates a stopper pin. The stopper pin is inserted in a through-hole 158 extending through a wall of the second damper mass 152 and through the second resilient member 154 in the axial direction of the damper 150, while having a clearance between the stopper pin 156 and a wall of the through-hole 158. The stopper pin 156 is screwed at one of exial ends thereof to the connection portion 30 of the damper pulley 12. The stopper pin 156 has at the other axial end a head portion 160 with a diameter larger than that of the through-hole 158. Therefore, if by any chance the second secondary vibration system (second damper mass or second resilient member) is broken, the stopper pin 156 stops the second secondary vibration system from falling off the damper 150.

The dual-type damper 150 enjoys the same advantages as those of the previously-described damper 110, that is, the vibration-damping effect on the torsional and bending vibrations of the rotation axle and the impact-absorbing effect on the impact produced between the second damper mass and the damper pulley. The dual-type damper 150 has another advantage of having a simpler construction than those of the previously-identified two dampers 10 and 148, because the damper 150 has no annular member 22, 132, or 142.

Figure 11:
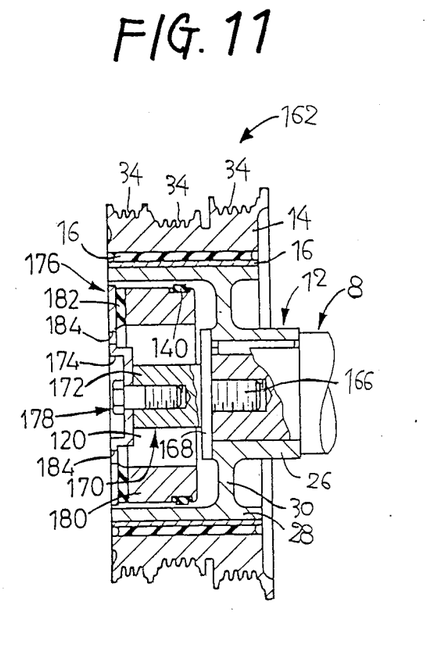

Referring to FIG. 11, there is illustrated a still further embodiment 162 of the dual-type damper according to the present invention.

The dual-type damper 162 is joined to a rotation axle 8 (crankshaft of an internal combustion engine) with the help of a set bolt 170. The set bolt 170 has a shaft portion 166 which is screwed to one axial end of the rotation axle 8, and a flange portion 168 which forcibly fixes a boss portion 26 of a damper pulley 12 to the rotation axle 8 with the shaft portion 166 screwed or fixed to the rotation axle 8. The set bolt 170 also has a head portion 172. A hat-like member 176 made of metal is secured to a free end of the head portion 172 with the help of an attachment bolt 178, so as to cover an opening of a second-mass space 120 of a cylindrical portion 28 of the damper pulley 12. The hat-like member 176 has a cylindrical space 174 at a central portion thereof. In the second-mass space 120, there is disposed a second damper mass 180 which has in an outside surface thereof a rubber stopper 140. The second damper mass 180 is secured to the hat-like member 176 through a second resilient member 182. In the figure, reference numeral 184 designates a plurality of through-holes which are formed through the hat-like member 176 in the axial direction of the damper 162. The through-holes 184 serve for preventing the damper 162 from being excessively heated, and therefore protecting the same 162 against decreased operating performance and decreased durability due to heat.

The dual-type damper 162 constructed as descirbed above has the same advantages as those of the damper 110, that is, the vibration-damping effect on the vibration of the rotation axle and the impact-absorbing effect on the impact produced between the second damper mass and the damper pulley. Further, the dual-type damper 162 enjoys an advantage in that, if by any chance the second resilient member 182 supporting the second damper mass 180 is broken or fractured, the second damper mass 180 is stopped from falling out of the damper 162 by the hat-like member 176. In this way, the present invention provides a safe damper. Also, the operation of assembling the second secondary vibration system and the operation of mounting the second secondary vibration system on the damper 162 are easily conducted. This is because the assembly (second secondary vibration system) which consists of the second damper mass 180, hat-like member 176, and second resilient member 182 vulcanized between the two members 180 and 176 is fixed to the rotation axle 8 by a bolt.

Figure 12:
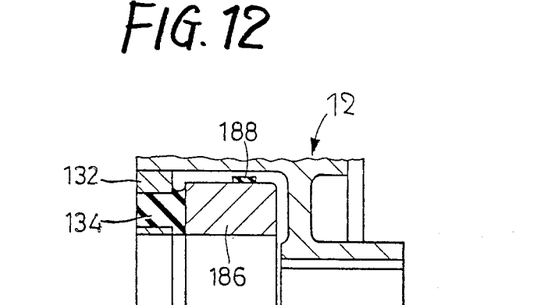
FIG. 12 is an illustrative view showing another way of mounting a resilient stopper on the second damper mass of the dual-type damper device of FIG. 7.

In the dual-type dampers 110, 148, 150, and 162, the annular resilient stopper 140 has an annular base portion which is fitted in an annular groove running in the outside surface of the second damper mass. The resilient stopper 140 may be exchangeable with an annular resilient stopper 188 as shown in FIG. 12. The annular resilient stopper 188 has a rectangular cross sectional shape with a predetermined height and is adhered to the outside surface of a second damper mass 186 with the help of a suitable adhesive. Other resilient stoppers are applicable to the dual-type damper of the present invention, so long as they are disposed on a region of the outside surface of the second damper mass which is expected to be impacted against the inside surface of the cylindrical portion of the damper pulley, when the second damper mass is largely displaced in the radial direction of the damper, and so long as they have a predetermined height enough to absorb the impact or shock produced between the second damper mass and the cylindrical portion.

The rubber stopper 140 may be disposed on a region of the inside surface of the cylindrical portion which includes spots which are expected to be impacted against the outside surface of the second damper mass in the case where the second damper mass is largely displaced. The impact produced between the second damper mass and the damper pulley is well absorbed in the dual-type damper which has the resilient stopper on the inside surface of the cylindrical portion of the damper pulley. Such a damper has a good impact-absorbing effect like the previously-described dampers having their resilient stopper on the outside surface of the second damper pulley.

While the present invention has been described in its preferred embodiments with a certain degree of particularity, it is to be understood that the invention is by no means limited thereto, but various changes, modifications, and improvements may be further made in the invention, in the light of the foregoing teachings, without departing from the spirit and scope of the invention.

The dual-type damper of the present invention is not limited to use for a crankshaft of an internal combustion engine. The dual-type damper is serviceable for various kinds of rotation axles which produce vibration, with good results as described about the illustrative embodiments.

Although the illustrative embodiments of the dual-type vibration damper also serve as a V-ribbed pulley, the V-shaped grooves are not essential for the present invention. In other words, the dual-type damper of the invention may be designed to serve only as a vibration damper for damping vibration of a rotation axle.

In the illustrative embodiments of the dual-type damper, the first damper mass 14 is connected to the metallic sleeve 36 through vulcanization of the first resilient member 16 therebetween, and the thus-formed assembly is press-fitted onto the outer surface of the cylindrical portion 28 of the damper pulley 12. The metallic sleeve 36 located innermost of the assembly is useful for the press-fitting. However, an important rule is that the first damper mass 14 is secured to the damper pulley 12 by way of the first resilient member 16 therebetween. Therefore, the first damper mass 14 may be press-fitted onto an outside surface of the metallic sleeve 36 located outermost of an assembly which consists of the metallic sleeve 36, pulley 12, and first resilient member 16 vulcanized between the sleeve 36 and pulley 12. Furthermore, the first damper mass 14 may be connected to the damper pulley 12 through vulcanization of the first resilient member 16 between the first mass 14 and pulley 12. In this case, the metallic sleeve is omitted.

What is claimed is:

1. A dual-type damper device for damping vibration of a rotation axle, comprising:
   a damper pulley including a boss portion joined to said rotation axle, a cylindrical portion located radially outwardly of said boss portion, and a connection portion connecting said boss portion and said cylindrical portion;
   a first damper-mass member disposed radially outwardly of said cylindrical portion of said damper pulley, such that said first damper-mass member is spaced apart from, and concentric with, said cylindrical portion;
   a first resilient member interposed between said cylindrical portion of said damper pulley and said first dampermass member;
   an annular member made of a metallic material and press-fitted onto an inside surface of said cylindrical portion of said damper pulley, said annular member having at least one through hole;
   a second damper-mass member having a cylindrical shape and disposed between said connection portion of said damper pulley and said annular member, in an inner space of said cylindrical portion of said damper pulley, such that said second damper-mass member and said cylindrical portion are concentric with each other; and
   a second resilient member supported by the annular member in the at least one through hole to be disposed between said annular member and one of axial ends of said second dampermass member which is opposed to said annular member, so as to secure said second damper-mass member to said annular member, said second resilient member being subjected to shear deformation thereof due to relative radial displacement between said annular member and said second damper-mass member.

2. A dual-type damper device according to claim 1, wherein said second damper-mass member is secured by said at least one through hole of said annular member by vulcanization of said second resilient member between said one axial end of said second damper-mass member and said annular member.

3. A dual-type damper device according to claim 1, wherein said first damper-mass member is in the form of a V-ribbed cylindrical body which has in an outside surface thereof a plurality of V-grooves.

4. A dual-type damper device according to claim 1, wherein said annular member prevents said second damper-mass member from falling off the dual-type damper device.

5. A dual-type damper device according to claim 1, further comprising a third resilient member which is mounted on an outside surface of said second damper-mass member, or on said inner surface of said cylindrical portion of said damper pulley which is opposed to said outside surface, said third resilient member being brought into butting contact with said inner surface of said cylindrical portion, or with said outside surface of said second damper-mass member, when said second damper-mass member is largely displaced relative to said cylindrical portion.

6. A dual-type damper device according to claim 5, wherein said third resilient member extends to a predetermined height from said outside surface of said damper-mass member toward said inside surface of said cylindrical portion of said damper pulley, or from said inside surface toward said outside surface.

7. A dual-type damper device according to claim 6, wherein said second damper-mass member has in said outside surface thereof an annular groove in which said third resilient member is partially fitted.

* * * * *